United States Patent
Abellera et al.

(10) Patent No.: US 9,690,295 B1
(45) Date of Patent: Jun. 27, 2017

(54) HEADING CONTROL ON A MARINE VESSEL

(71) Applicant: Brunswick Corporation, Lake Forest, IL (US)

(72) Inventors: Ryan C. Abellera, Fond du Lac, WI (US); Todd D. Dannenberg, Oshkosh, WI (US); Mark W. Henker, Fond du Lac, WI (US); Yana V. Foltice, Campbellsport, WI (US); Brian J. Poirier, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/830,991

(22) Filed: Aug. 20, 2015

(51) Int. Cl.
| | |
|---|---|
| *B60L 3/00* | (2006.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G05D 1/02* | (2006.01) |
| *B63H 25/02* | (2006.01) |
| *B63H 5/20* | (2006.01) |
| *B63H 5/125* | (2006.01) |
| *B63H 20/08* | (2006.01) |

(52) U.S. Cl.
CPC .......... *G05D 1/0206* (2013.01); *B63H 25/02* (2013.01); *G06F 17/00* (2013.01); *B63H 2025/026* (2013.01)

(58) Field of Classification Search
CPC .......................... G05D 1/0206; B63H 21/213
USPC .................. 701/21, 431; 440/61 S, 1, 43, 61
See application file for complete search history.

(56) References Cited

U.S. PATENT DOCUMENTS

| | | |
|---|---|---|
| D357,947 S | 5/1995 | Richer |
| D366,655 S | 1/1996 | Sanchez et al. |
| 5,982,355 A | 11/1999 | Jaeger et al. |
| D444,785 S | 7/2001 | Whitehorn et al. |
| D449,614 S | 10/2001 | Osborn et al. |
| 6,826,042 B2 | 11/2004 | Oross et al. |
| 6,896,563 B1 | 5/2005 | Dickson |
| D558,767 S | 1/2008 | Solland |
| D598,023 S | 8/2009 | Miller et al. |

(Continued)

OTHER PUBLICATIONS

BMW Technology Guide: iDrive, http://www.bmw.com/com/en/insights/technology/technology_guide/articles/idrive, website visited Jun. 10, 2015.

(Continued)

*Primary Examiner* — Mahmoud Ismail
(74) *Attorney, Agent, or Firm* — Andrus Intellectual Property Law LLP (57) ABSTRACT

A propulsion and steering control system for a marine vessel has a joystick device operable to provide control commands, the joystick device having a handle extending on an axis. The control system also has a control unit that receives control commands from the joystick device and correspondingly controls at least one marine drive. The joystick device and the control unit operate in a Heading mode such that the control unit controls the marine drive to automatically maintain the selected heading of the marine vessel. Rotation of the handle about the axis adjusts the selected heading by a predefined increment.

20 Claims, 7 Drawing Sheets

(56) References Cited

U.S. PATENT DOCUMENTS

| | | | |
|---|---|---|---|
| D599,829 S | 9/2009 | Jorgensen et al. | |
| 8,060,265 B2 | 11/2011 | Hallenstvedt et al. | |
| D693,346 S | 11/2013 | Coulter | |
| D698,357 S | 1/2014 | Mainville et al. | |
| 8,700,238 B2 | 4/2014 | Hiramatsu | |
| 8,924,054 B1 | 12/2014 | Arbuckle et al. | |
| 8,925,414 B1 | 1/2015 | Park et al. | |
| 9,201,514 B1* | 12/2015 | Brandt | G06F 3/0338 |
| 2006/0180070 A1* | 8/2006 | Mizutani | B63H 25/24 |
| | | | 114/144 RE |
| 2006/0217012 A1* | 9/2006 | Mizutani | B63H 20/12 |
| | | | 440/61 S |
| 2007/0244639 A1* | 10/2007 | Butterworth | G05D 1/0206 |
| | | | 701/431 |
| 2008/0288093 A1 | 11/2008 | Kamentser et al. | |
| 2008/0308400 A1 | 12/2008 | States et al. | |
| 2009/0055003 A1 | 2/2009 | Tunick et al. | |
| 2010/0151750 A1* | 6/2010 | Ito | B63H 20/12 |
| | | | 440/1 |
| 2011/0172858 A1* | 7/2011 | Gustin | B63H 21/213 |
| | | | 701/21 |
| 2011/0279370 A1 | 11/2011 | Wang et al. | |
| 2013/0072076 A1* | 3/2013 | Pellegrinetti | B63H 5/125 |
| | | | 440/1 |

OTHER PUBLICATIONS

Joystick driving—EVC Options: Volvo Penta, http://volvopenta.com/volvopenta/east_europe/en-ee/marine_leisure_engines/accessories, website visited Jun. 10, 2015.

* cited by examiner

HEADING CONTROL ON A MARINE VESSEL

BACKGROUND

U.S. Pat. No. 8,700,238 is incorporated herein by reference in its entirety and discloses a marine vessel propulsion control apparatus arranged to control a propulsion unit and a steering unit. The marine vessel propulsion control apparatus includes a joystick unit, and a control unit programmed to control an output of the propulsion unit and a steering angle of the steering unit in accordance with an output signal of the joystick unit. The joystick unit includes a lever that is tiltable from a neutral position and arranged to be operated by a marine vessel operator to command a heading direction and stem turning of a hull. The control unit is programmed to maintain the steering angle of the steering unit when the output of the propulsion unit is stopped.

U.S. Pat. No. 7,497,746 is incorporated herein by reference in its entirety and discloses a method of steering a watercraft propulsion device mounted to a transom plate and having a steering drive unit which allows the watercraft propulsion device to rotationally move about a swivel shaft. The method can include calculating a steering control amount for the steering drive unit in accordance with the degree of operator's steering wheel displacement and a predetermined steering system response performance, and operating the steering drive unit based on the calculated control physical quantity, in which the predetermined steering system response performance can be, selected from a plurality of plurality of predetermined steering system response performance options.

U.S. Patent Publication No. 2009/0197486 is incorporated herein by reference in its entirety and discloses an aquatic vessel (500) that includes a hull (20) and two engines (30, 50), the engine (30, 50) outputs being rotationally couplable to corresponding propeller units (332, 352) which are mounted so as to be angularly moveable in respect of the hull (20). The vessel (500) includes a control unit (70) for controlling operation of the engines (30, 50) and angles ($\alpha_1$, $\alpha_2$) of the propeller units (332, 352) with respect to the hull (20). The vessel (500) is configurable to operate in a first mode wherein directions of thrust developed by the propeller units (332, 352) are mutually substantially parallel for propelling the vessel (500) through water, and a second "fishing" mode of operation wherein the directions of thrust developed by the propeller units (332, 352) are configured to mutually diverge with respect to a longitudinal axis from a rear end of the vessel (500) to a forward end thereof for providing the vessel (500) with a turning characteristic (160) in operation. The control unit (70) is configured to receive in operation user-instructions for commanding the control unit (70) to operate in the second mode for causing the propeller units (3320, 352) to be angularly orientated in a divergent manner in respect of the longitudinal direction. The control unit (70) controls rotation of the vessel (500) by controlling power coupled from the two engines (30, 50) and delivered to their propeller units (332, 352) and forward/reverse coupling of the propeller units (332, 352).

U.S. Pat. No. 8,925,414 is incorporated herein by reference in its entirety and discloses a device for inputting command signals to a marine vessel control system that includes a lever that is selectively operable in a joystick mode and a lever mode. In the lever mode, the lever is confined to pivoting about a horizontal axis to thereby input throttle and shift commands to the control system. In the joystick mode, the lever is freely pivotable in all directions away from a vertical axis that is perpendicular to the horizontal axis to thereby input throttle, shift, and directional commands to the control system.

U.S. Pat. No. 8,807,059 is incorporated herein by reference in its entirety and discloses systems for maneuvering a marine vessel comprise an input device for requesting lateral movement of the marine vessel with respect to the longitudinal axis and a plurality of propulsion devices including at least a port propulsion device, a starboard propulsion device and an intermediate propulsion device disposed between the port and starboard propulsion devices. A control circuit controls orientation of the port and starboard propulsion devices inwardly towards a common point on the marine vessel, and upon a request for lateral movement of from the input device, operates one of the port and starboard propulsion devices in forward gear, operates the other of the port and starboard propulsion devices in reverse gear, and operates the intermediate propulsion device in reverse gear.

U.S. Pat. No. 7,467,595 is incorporated herein by reference in its entirety and discloses a method for controlling the movement of a marine vessel that rotates one of a pair of marine propulsion devices and controls the thrust magnitudes of two marine propulsion devices. A joystick is provided to allow the operator of the marine vessel to select port-starboard, forward-reverse, and rotational direction commands that are interpreted by a controller which then changes the angular position of at least one of a pair of marine propulsion devices relative to its steering axis.

U.S. Pat. No. 7,467,596 is incorporated herein by reference in its entirety and discloses a trim tab control system that determines current tab position based upon a feedback signal that represents incremental motion of the actuator drive motor. Prior to power down, the current tab position is stored in non-volatile memory, and is retrieved on power up. The control system characterizes the actuator during a learning function by driving the actuator between the upper and lower limit positions and counting the number of increments. The display of tab position is based upon the current tab position count and the number of increments in a full range of motion. Automatic up and down commands cause the actuator to be driven up or down until a stop command is received or a limit position is reached.

U.S. Pat. No. 7,305,928 is incorporated herein by reference in its entirety and discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,037,150 is incorporated herein by reference in its entirety and discloses a control system and apparatus for controlling waterjet-driven marine vessels. Some aspects allow for generation of a plurality of actuator control signals from a single vessel control signal, such as those provided by vessel control apparatus. A control stick embodiment provides a control apparatus that comprises a shaft moveable in at least one degree of freedom to provide the vessel control signals. Some aspects allow for an intuitive direct movement of the vessel in correspondence to movements of the control apparatus. Yet other aspects allow for locking out on or more degrees of freedom while other degrees of freedom and not locked out.

U.S. Pat. No. 6,975,959 is incorporated herein by reference in its entirety and discloses a mobile device for enhanced navigation and orientation including a visualization interface, a first sensor for providing signals indicative of a movement of the mobile device, a second sensor for providing further signals indicative of a movement of the mobile device, and a processor receiving signals from the first and second sensors, calculating a position and an orientation of the mobile device from the received signals, and generating a real time simulation of an environment via the visualization interface based on the position and orientation of the mobile device. According to an embodiment, the first and second sensors are implemented as an inertial sensor and a GPS receiver, respectively.

U.S. Pat. No. 7,727,036 is incorporated herein by reference in its entirety and discloses a system and method for controlling movement of a marine vessel. An operator controllable device outputs a signal that is representative of an operator-desired rate of position change of the vessel about or along an axis. A sensor outputs a signal that is representative of a sensed actual rate of position change of the vessel about or along the axis. A rate of position change controller outputs a rate of position change command based upon the difference between the desired rate of position change and the sensed rate of position change. A vessel coordination controller controls movement of the vessel based upon the rate of position change command.

U.S. Patent Publication No. 2011/0172858 is incorporated herein by reference in its entirety and discloses a marine propulsion and steering system for a vessel having multiple modes of operation, an axial propulsion system, a maneuvering propulsion system and a maneuvering control system including a pilot controllable joystick for generating propulsion and maneuvering control commands representing vessel motions desired by a pilot. An input loop is responsive to the joystick control commands to generate maneuvering commands representing the magnitudes and directions of motions of the vessel desired by the pilot and the actuator loop controller is responsive to the maneuvering commands from the input loop to generate corresponding vessel control commands to the vessel propulsion and maneuvering systems.

U.S. Pat. No. 8,924,054 is incorporated herein by reference in its entirety and discloses systems and methods for orienting a marine vessel having a marine propulsion device. A control circuit controls operation of the marine propulsion device. A user input device inputs to the control circuit a user-desired global position and a user-desired heading of the marine vessel. The control circuit calculates a position difference between the user-desired global position and an actual global position of the marine vessel and controls the marine propulsion device to minimize the position difference. The control circuit controls the marine propulsion device to orient an actual heading of the marine vessel towards the user-desired global position when the position difference is greater than a threshold. When the position difference is less than the threshold, the control circuit controls the marine propulsion device to minimize a difference between the actual heading and the user-desired heading while minimizing the position difference.

U.S. Pat. No. 8,777,681 is incorporated herein by reference in its entirety and discloses systems for maneuvering a marine vessel comprising a plurality of marine propulsion devices that are movable between an aligned position to achieve of movement of the marine vessel in a longitudinal direction and/or rotation of the marine vessel with respect to the longitudinal direction and an unaligned position to achieve transverse movement of the marine vessel with respect to the longitudinal direction. A controller has a programmable circuit and controls the plurality of marine propulsion devices to move into the unaligned position when a transverse movement of the marine vessel is requested and to thereafter remain in the unaligned position after the transverse movement is achieved. Methods of maneuvering a marine vessel comprise requesting transverse movement of the marine vessel with respect to a longitudinal direction and operating a controller to orient a plurality of marine propulsion devices into an unaligned position to achieve the transverse movement, wherein the plurality of marine propulsion devices remain in the unaligned position after the transverse movement is achieved.

U.S. Pat. No. 8,478,464 is incorporated herein by reference in its entirety and discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

U.S. Pat. No. 8,417,399 is incorporated herein by reference in its entirety and discloses systems and methods for orienting a marine vessel to minimize at least one of pitch and roll in a station keeping mode. A control device having a memory and a programmable circuit is programmed to control operation of the plurality of marine propulsion devices to maintain orientation of a marine vessel in a selected global position and heading. The control device receives at least one of actual pitch and actual roll of the marine vessel in the global position and controls operation of the plurality of marine propulsion units to change the heading of the marine vessel to minimize at least one of the actual pitch and the actual roll while maintaining the marine vessel in the selected global position.

U.S. Pat. No. 8,050,630 is incorporated herein by reference in its entirety and discloses a method for determining the validity of a signal received by a GPS receiver. A signal that is unfiltered, either mathematically or electronically, is monitored to determine the variability of different occurrences of the signal. These occurrences, which may be sequential, are compared to each other in order to detect whether or not variation exists between one occurrence of the signal and a subsequent occurrence of the signal. If no variation exists, it is determined that the signal is invalid and that a loss of fix of the satellite signal has occurred. If sufficient variability exists in the signal, between successive occurrences, the signal is deemed to be valid and suitable for use to control a vehicle such as a marine vessel.

U.S. Pat. No. 7,267,068 is incorporated herein by reference in its entirety and discloses a marine vessel maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 8,145,371 is incorporated herein by reference in its entirety and discloses a dynamic control system for a marine vessel having two or more waterjet units as the primary propulsion system of the vessel, for maintaining vessel position or velocity when in a dynamic control mode, comprises a position or velocity indicator to indicate vessel position or velocity or deviations in vessel position or velocity; such as a satellite-based positioning system indicator, or accelerometers as a relative position indicator, a heading indicator to indicate vessel heading from position heading or yaw rate or deviations in vessel heading or yaw rate, such as a compass as an absolute heading indicator or a yaw rate sensor as a relative heading indicator, and a controller to control the operation of the waterjet units to substantially maintain the vessel position or velocity, and vessel heading or yaw rate when the dynamic control mode is enabled.

U.S. Pat. No. 6,885,919 is incorporated herein by reference in its entirety and discloses a process by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 5,884,213 is incorporated herein by reference in its entirety and discloses a system for controlling the navigation of a fishing boat between waypoints representing successive positions around a navigation route. The system includes an input device for setting the waypoint positions, a position detector to detect the actual position of the fishing boat, a trolling motor to produce a thrust to propel the fishing boat, a steering motor to control the direction of the thrust, and a heading detector to detect the actual heading of the fishing boat. The system also includes a control circuit which determines a desired heading using a desired waypoint and the actual position of the fishing boat, and generates a steering control signal applied to the steering motor to steer the fishing boat from the actual position to the desired waypoint. The system operates in various modes which allow repeated navigation of the fishing boat around a navigation route. The system provides for automatic waypoint storage as the fishing boat is maneuvered around a navigation route.

U.S. Pat. No. 8,694,248 is incorporated herein by reference in its entirety and discloses systems and methods for monitoring the accuracy of a global positioning system (GPS) receiver in a marine vessel utilize a GPS receiver receiving a plurality of satellite signals, calculating a global position of the GPS receiver based on the plurality of signals, and determining a signal to noise ratio (SNR) of each signal in the plurality of signals; and a control circuit having a computer readable medium having executable code, and being connected to the GPS receiver by a communication link. The control circuit calculates an average SNR of the plurality of signals and compares the average SNR to a threshold SNR. In one example the threshold SNR varies depending upon a number of satellites sending the plurality of signals and a speed at which the marine vessel is traveling.

SUMMARY

This Summary is provided to introduce a selection of concepts that are further described herein below in the Detailed Description. This summary is not intended to identify key or essential features of the claimed subject matter, nor is it intended to be used as an aid in limiting the scope of the claimed subject matter.

In one embodiment, a propulsion and steering control system for a marine vessel has a joystick device operable to provide control commands, the joystick device having a handle extending on an axis. The control system also has a control unit that receives control commands from the joystick device and correspondingly controls at least one marine drive. The joystick device and the control unit operate in a Heading mode such that the control unit controls the marine drive to automatically maintain the selected heading of the marine vessel. Rotation of the handle about the axis adjusts the selected heading by a predefined increment.

In one embodiment of a method of controlling a marine vessel, a joystick device is provided that is operably connected to a control unit for controlling at least one marine drive. The joystick device has a handle extending on an axis that is rotatable about that axis. The method includes engaging a heading mode as the control unit is controlling the marine drive with the control unit to automatically maintain a selected heading of the marine vessel. A rotation of the handle about the axis is detected. The selected heading is then adjusted by a predefined increment in response to the rotation, and the at least one marine drive is controlled to propel the marine vessel toward the adjusted heading.

BRIEF DESCRIPTION OF THE FIGURES

The present disclosure is described with reference to the following Figures. The same numbers are used throughout the Figures to reference like features and like components.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
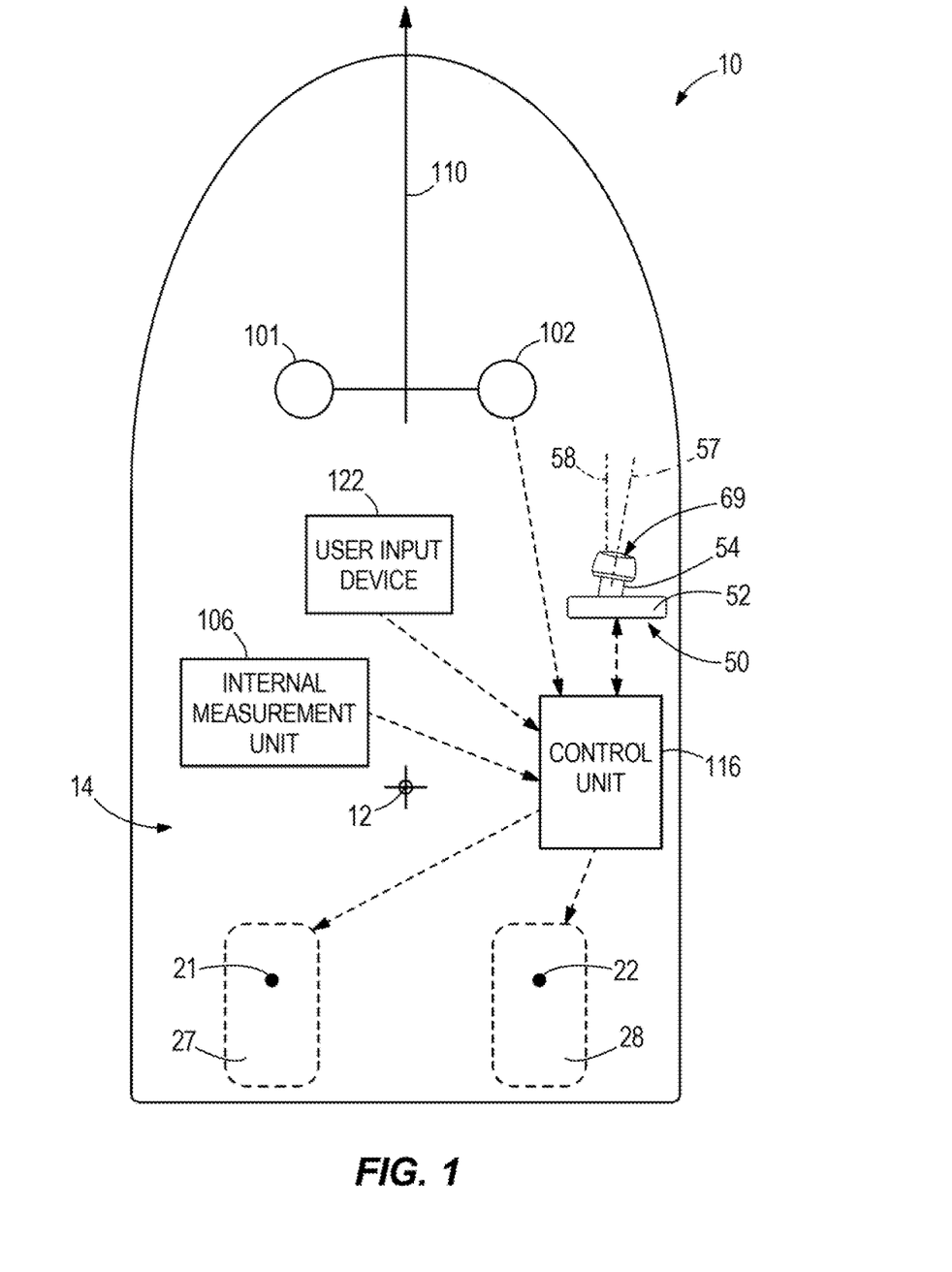
FIG. 1 is a schematic representation of a marine vessel equipped with a propulsion and steering control system including a joystick.

FIG. 1 schematically depicts an embodiment of a marine vessel 10 having a propulsion and steering control system 14 including a joystick device 50 with an adjustable display 69 thereon. It should be understood that the particular configuration of the marine vessel 10, and the propulsion and steering system 14 shown and described, is one exemplary embodiment of such a system with which a joystick device 50 with an adjustable display 69 may be used. It is possible to apply the concepts described in the present disclosure with substantially different configurations for marine vessels and control systems therefore. For example, the marine vessel 10 depicted in FIG. 1 has first and second propulsion devices 27, 28. It should be understood that the concepts disclosed in the present disclosure are applicable to a marine vessel having any number of marine propulsion devices and any configuration of a propulsion device, such as a propeller, impeller, pod drive, and the like, which may be driven by any marine drive, such as an outboard motor, an inboard drive, or an inboard/outboard drive (or stem drive), as will be apparent to those of ordinary skill in the art. In addition, the control systems described herein include certain operational structures such as global positioning systems (GPS) 101, 102 devices and inertial measurement units (IMUs) 106. It should be understood that such systems may or may not be used in conjunction with the joystick device 50 disclosed herein, and that the concepts disclosed in the present disclosure are capable of being implemented with different types of control systems and are not limited to the propulsion and steering control systems 14 described and depicted herein.

In FIG. 1, a marine vessel 10 having center of gravity along axis 12 is schematically illustrated. The marine vessel 10 has two marine drives 27 and 28, each having a steering axis, 21 and 22 respectively. The operation of the marine drives 27 and 28, including their rotation about steering axes 21 and 22, is controlled by the propulsion and steering control system 14. The propulsion and steering control system 14 includes a global positioning system (GPS) which, in the depicted embodiment, comprises a first GPS device 101 and a second GPS device 102 located at preselected fixed positions on the marine vessel 10 to provide information related to the global position of the marine vessel 10 in terms of latitude and longitude. The GPS system also includes an inertial measurement unit (IMU) 106. The IMU can be, for example, part 8M0048162 available from Mercury Marine, of Fond du Lac, Wis. In certain embodiments, the IMU 106 may comprise a differential correction receiver, accelerometers, angular rate sensors, and a microprocessor which manipulates the information obtained from these devices to provide information relating to the current position of the marine vessel 10 in terms of longitude and latitude, the current heading of the marine vessel 10 (represented by arrow 110), and the velocity and acceleration of the marine vessel 10 in six degrees of freedom.

The propulsion and steering control system 14 further includes a user input device 122 which may be used to provide control commands to control any number of aspects of the propulsion and steering of the marine vessel 10. For example, the user input device 122 may enable a user to provide input to control any one or more of the route, headings, control mode, propulsion speed, gear, direction, and the like. In exemplary embodiments, the user input device 122 may comprise one or more of a display screen, a touch screen, push buttons, a keyboard, or the like. Alternatively or additionally, the user input device 122 may further include remotely operated or wireless devices not physically installed on the marine vessel 10, such as a fob or other type of remote activator or controller. In another embodiment, the user input device 122 may be combined with the joystick device 50, and/or the joystick device 50 may incorporate user input devices other than just the handle 54, as disclosed in certain embodiments herein.

The control system 14 further includes a joystick device 50 having a handle 54 that can move in various directions. The handle 54 extends from a housing 52. In the depicted embodiment, the handle 54 extends upward from the housing 52 along an axis 57. The handle 54 is depicted in a tilted position, away from its upright center axis 58, for example providing a control command to the control unit 116. As will be known to one of skill in the art, the joystick device 50 may be used to control the steering and propulsion system to affect any range of translational and/or rotational motion of the marine vessel 10. Motions of the joystick device 50 include tilt in the forward, back, right, and left directions, and any combinations thereof (such as tilt forward to the right, or back to the left, etc.) and rotation about the axis 57 of the handle 54, which can be combined with the tilt motions. The corresponding motions of the marine vessel 10 as controlled by movements of the joystick device 50 include translational movements in four basic directions, including forward axial motion, reverse axial motion, port lateral motion, starboard lateral motion, and any direction therebetween. A marine vessel 10 may also be controlled by the joystick device 50 to perform rotational movement about a vertical axis of the marine vessel 10, such as axis 12 along the center of gravity of the marine vessel 10. It is to be appreciated that the aforementioned motions of the handle 54 of the joystick device 50 may also invoke other control commands other than steering commands, depending on the control mode of the joystick device 50.

The propulsion and steering control system 14 further includes a control unit 116. The control unit 116 includes a memory, a programmable processor, and programmable input/output peripherals. As is conventional, the processor can be communicatively connected to a computer readable medium that includes volatile and/or nonvolatile memory upon which computer readable code is stored. The processor can access the computer readable code and the computer readable medium upon executing the code carries out functions as described herein below. The control unit 116 is operatively connected to the various elements of the propulsion and steering control system 14, including the GPS device(s) 102, the IMU 106, the user input device(s) 122, the joystick device 50, and the first and second marine drives 27 and 28. The control unit 116 can receive inputs and send outputs via a CAN bus as described in U.S. Pat. No. 6,273,771 which is incorporated herein by reference in its entirety. In other examples, the control unit 116 is connected to various portions of the control system 14, as well as other devices on the marine vessel 10, via wireless communication rather than by a wired CAN bus.

In one embodiment, the control unit 116 may receive information from a user input device 122 that allows the operator of the marine vessel 10 to manually select a mode of operation, or a control mode. As an example, the user input device 122 can be an input screen or a set of push buttons that allows the operator of the marine vessel to manually select various modes of operation associated with the marine vessel 10. As is provided herein, such a user input device 122 for selection of a control mode may be integrated into the joystick device 50. The user interface 122 and/or the joystick device 50 may be used by an operator of the marine vessel to select a control mode and provide an enabling signal that informs the control unit 116 that the operator desires to operate the marine vessel 10 in accordance with that control mode. Exemplary control modes may include a station keeping mode that maintains the position of the marine vessel in a selected location, such as at a GPS location and at a particular heading, (referred to herein as "Skyhook mode"). Another exemplary control mode is a direction control mode that maintains or controls the heading of the marine vessel in accordance with a user selected heading (referred to herein as "Heading mode"). Another exemplary control mode includes a route-planning mode that controls the heading and/or propulsion of the marine vessel 10 in order to execute a user selected route plan (referred to herein as "Route mode"). Such control modes are known in the art and examples are described in the prior art references incorporated herein, including at U.S. Pat. Nos. 8,417,399, 7,305,928, 8,050,630, 8,478,464, 8,924,054, 6,885,919, and 5,884,213.

Figure 4:
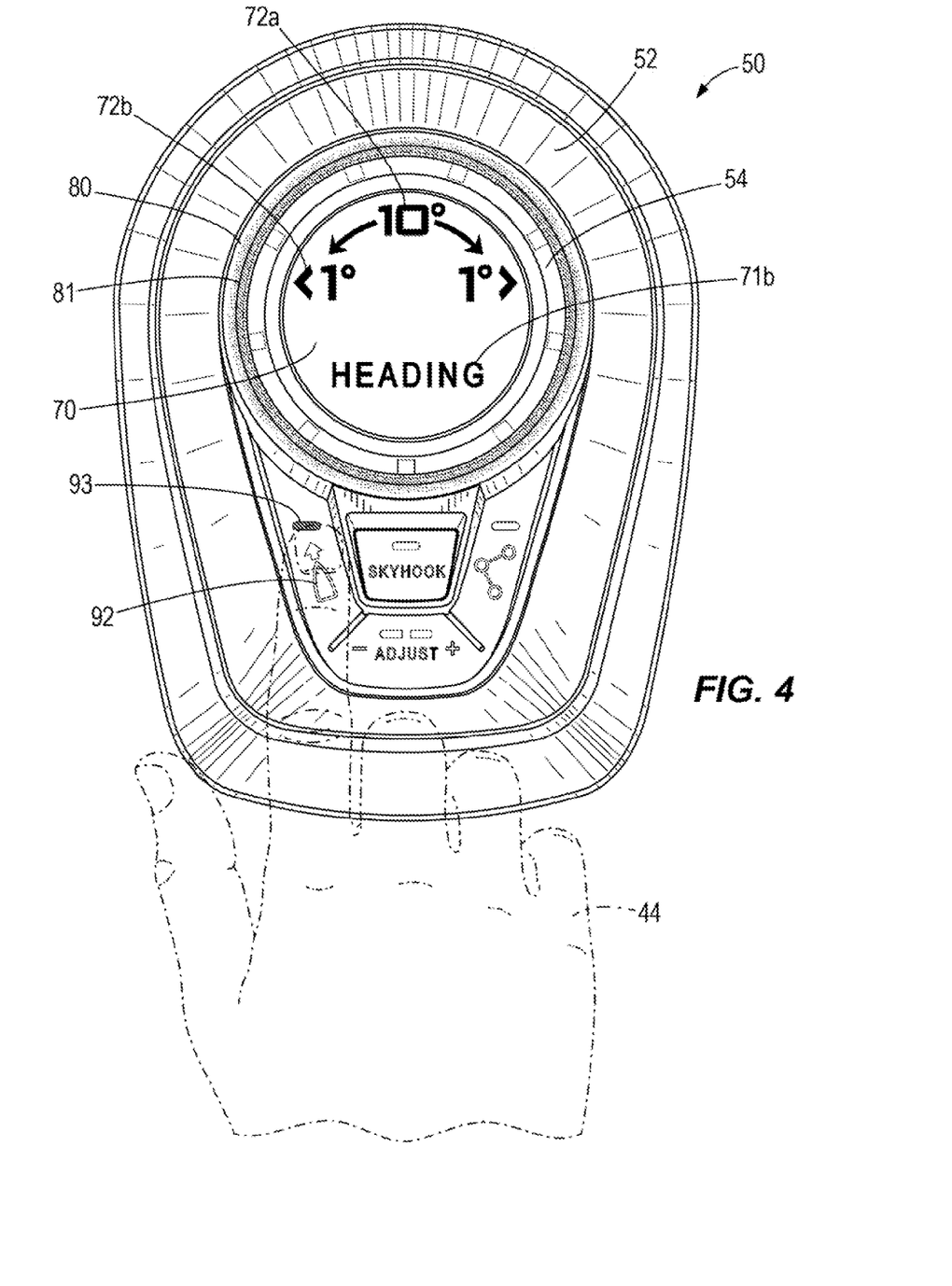
FIG. 4 illustrates another embodiment of a method and system of heading control.

As will be described in further detail below, the joystick device 50 and/or control unit 116 may be configured to variously allow an operator to use the joystick device 50, and particularly the handle 54, to manually steer or maneuver the marine vessel 10, or to adjust the station, heading, route, speed, or the like, depending on the selected control mode. For example, the joystick device 50 and control unit 116 may operate differently to control the marine drives 27 and 28 in Heading mode, than they would in other modes. In Heading mode, the control unit 116 may control the marine drives 27 and 28 to automatically maintain a selected Heading for the marine vessel 10. Such systems and arrangements are known in the art and examples are described in prior art references incorporated herein, including U.S. Pat. Nos. 5,884,213, 6,885,919, 7,305,928, 8,050,630, 8,417,399, and 8,924,054. An example of the joystick device 50 in Heading mode is shown in FIG. 4 and described below.

Figure 3A:
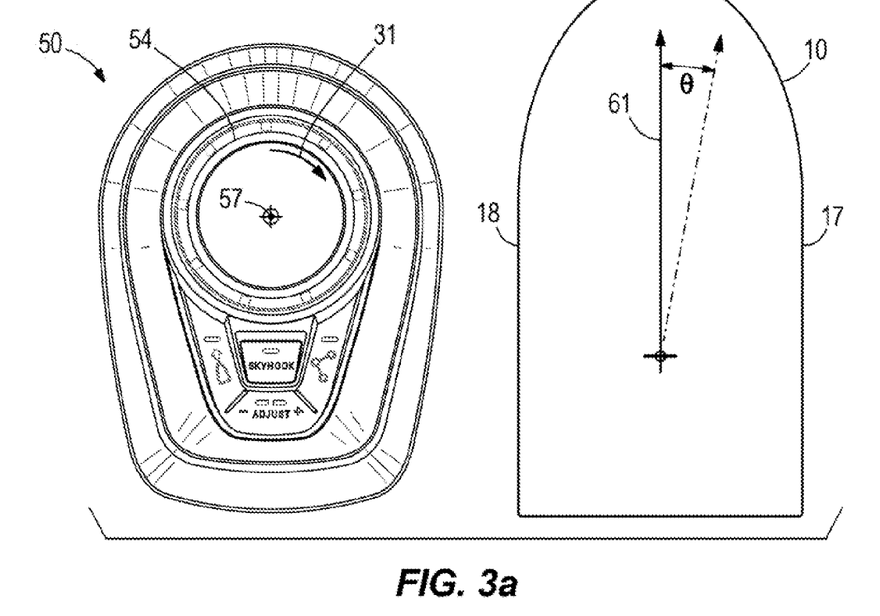
FIGS. 3a-3b illustrate one embodiment of a method and system for heading control.
Figure 3B:
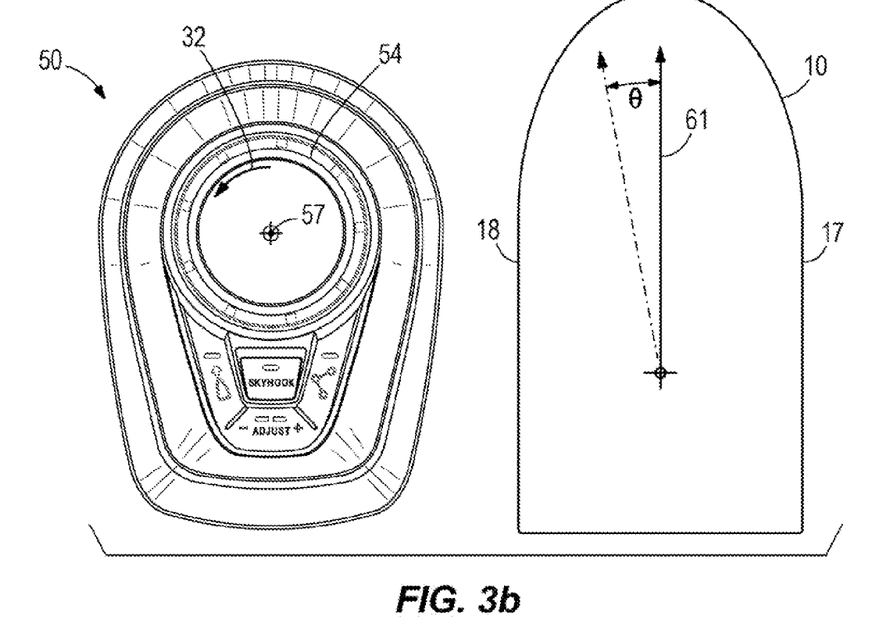
Figure 3C:
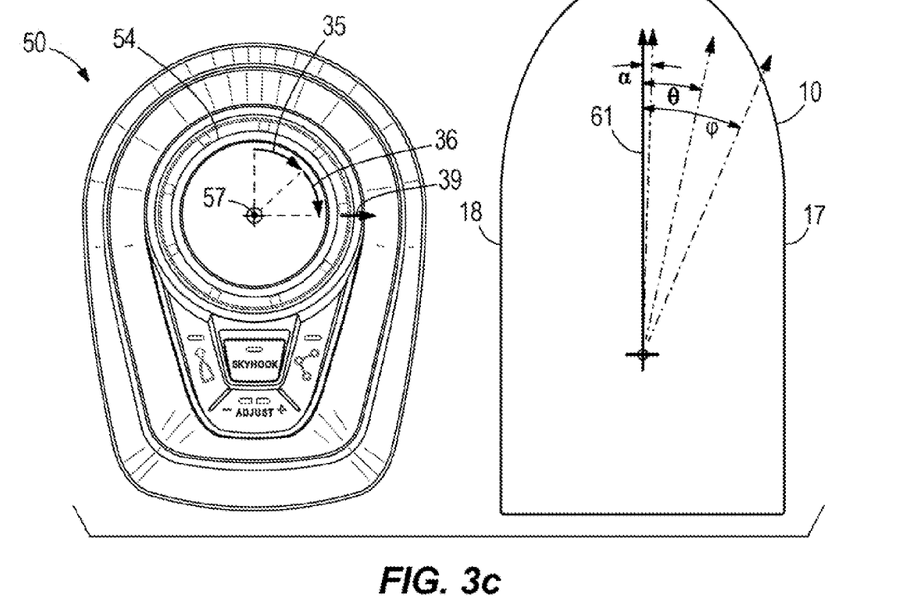
FIGS. 3c-3d illustrate another embodiment of a method and system for heading control.
Figure 3D:
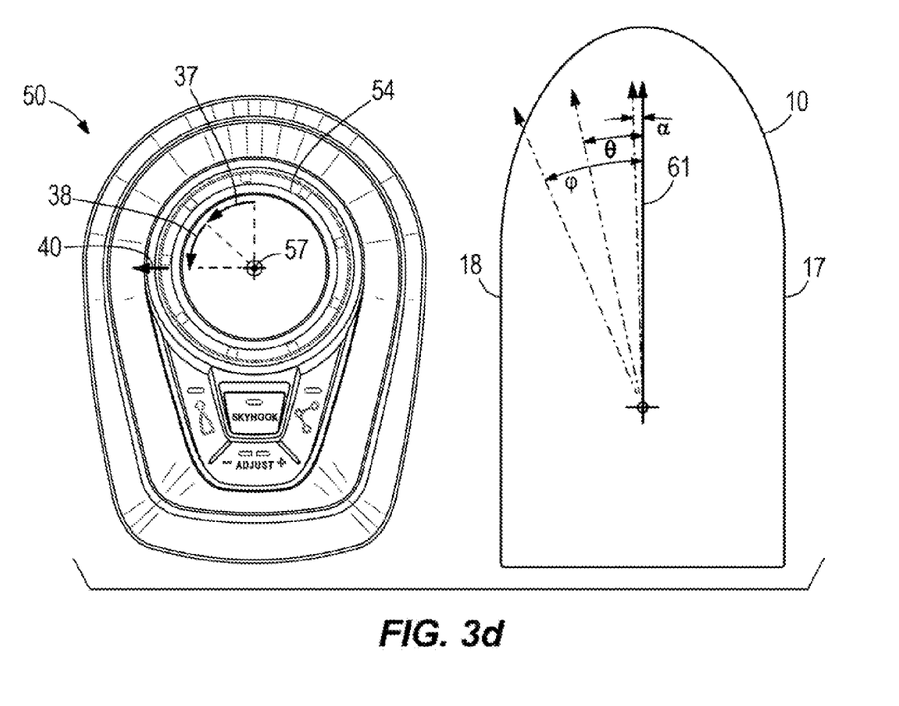

The joystick device 50 may be configured to have a Heading mode, whereby an operator can use the joystick device 50 to adjust the selected heading. As exemplified in FIGS. 3a-3d, the joystick device 50 and/or the control unit 116 may be configured such that an operator can adjust the selected heading 61 by turning the handle 54 about its axis 57. More specifically, FIG. 3a depicts an embodiment wherein turning the handle 54 in the clockwise direction of arrow 31 adjusts the selected heading 61 by predefined increment θ towards the starboard direction 17. Likewise, FIG. 3b demonstrates that turning the handle 54 about axis 57 in the counterclockwise direction of arrow 32 adjusts the selected heading 61 by the predefined increment θ towards the port direction 18. In yet another embodiment depicted at FIGS. 3c and 3d, the joystick device 50 and/or the control unit 116 may be configured such that different actions of the handle 54 provide different control commands to adjust the selected heading 61. In the depicted embodiment, the handle may be turned clockwise or counterclockwise to a first angle, as depicted by arrows 35 and 37, to adjust the selected heading 61 by predefined increment θ. For example, the first angle providing adjustment by predefined increment θ may be any angle within a predefined range, such as between 0 and 45 degrees. In the depicted embodiment, if the handle 54 is rotated about its axis 57 by more than a first angle or angle range, the selected heading 61 may be adjusted by a different predefined increment. FIGS. 3c and 3d exemplify that turning the handle 54 in the clockwise or counterclockwise directions to a second angle in a second predefined range of angles, as depicted by arrows 36 and 38, will adjust the selected heading 61 in the appropriate direction by a predefined increment ϕ. Alternatively or additionally, other movements of the handle 54, other than rotation, may be implemented to adjust the selected heading 61. For example, tilting the handle 54 rightward in the direction of arrow 39 may provide a control command to adjust the selected heading 61 in the starboard direction by predefined increment α, and tilting the handle 54 left in the direction of arrow 40 may adjust the selected heading 61 in the port direction 18 by predefined increment α. In still other embodiments, various implementations of associating control commands, or movements of the handle 54, with various adjustments of the selected heading 61 by various predefined increments may be implemented. The predefined increments θ, ϕ, and α may be any angular value. In an exemplary embodiment, θ=5°, ϕ=10°, and α=1°.

The joystick device 50 may have one or more adjustable displays 69 which may be on the handle 54 or the housing 52 of the joystick. The adjustable display 69 may be adjusted based on the control mode and/or in response to movement of the handle 54. For example, the adjustable display 69 may be configured to variously display a mode indicator 71 that indicates an activated control mode (e.g., "Skyhook," "Route," or "Heading"), receipt and/or execution of a control command (e.g., to indicate a direction of a steering control command), or available control options 72 (e.g., indicating the control commands associated with certain movements of the handle 54). The adjustable display 69 may be located anywhere on the joystick, including the handle 54 and the housing 52, and may be any type of display that is adjustable to display information as described herein. In exemplary embodiments, the adjustable display 69 may comprise any one or more of an adjustable indicator light or an electronic display, such as a light-emitting diode (LED) display, a liquid-crystal display (LCD), an electronic-paper display, an electro-luminescent display (ELD), or a plasma-display panel (PDP). In one such embodiment, the adjustable display may be a set of indicator lights that are independently illuminable to indicate the control mode of the joystick device 50 or control options 72 available to an operator 44 by moving the handle 54 in specified directions. In certain embodiments, each mode indicator 71 and/or control option 72 may have a unique configuration and/or color.

Figure 2:
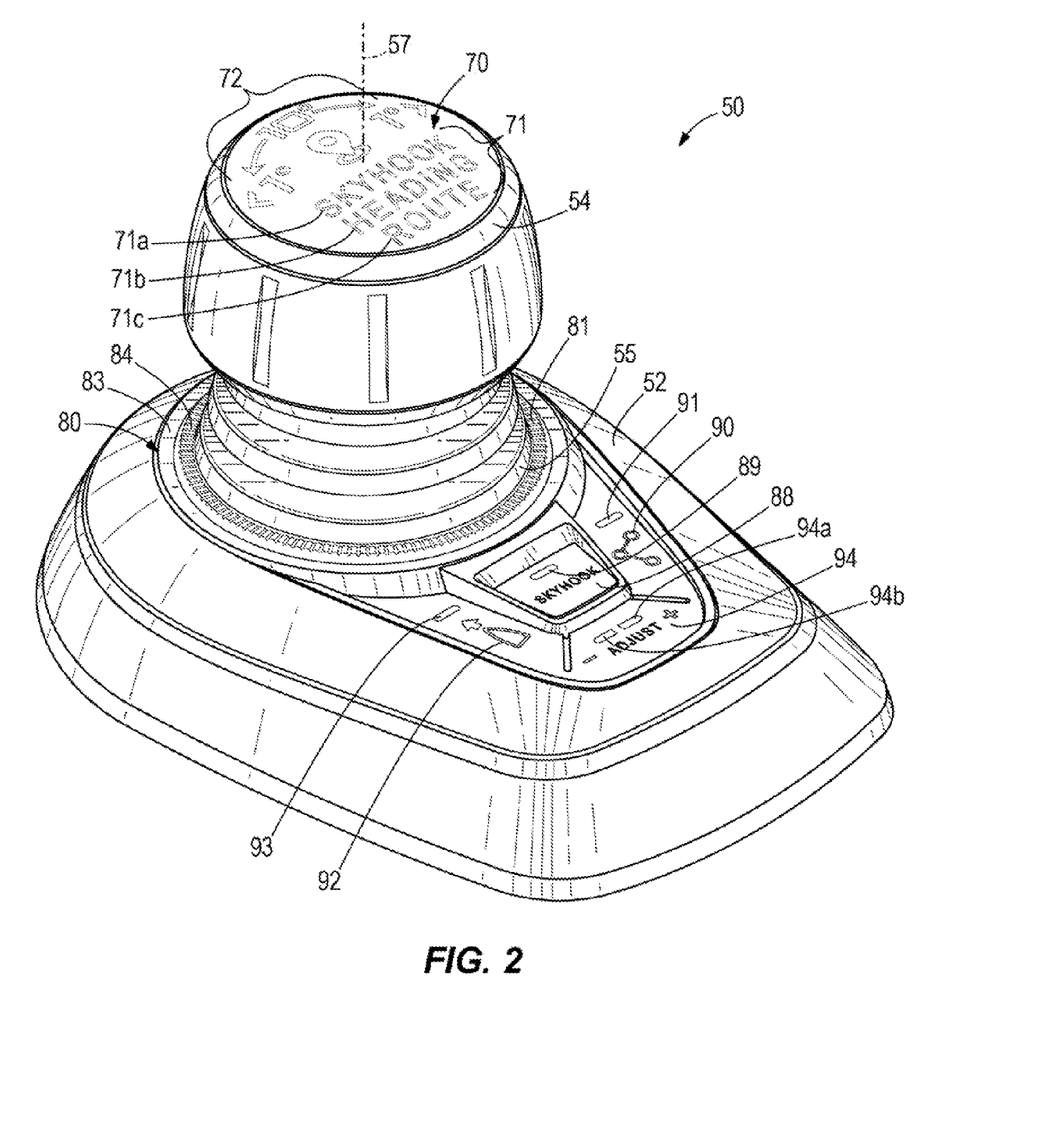
FIG. 2 illustrates one embodiment of a joystick with an adjustable display.

FIG. 2 depicts an exemplary embodiment of a joystick device 50 having handle 54 and housing 52. The depicted embodiment has two adjustable displays, an upper display 70 on a top portion of the handle 54 and a lower display 80 on the housing 52 at the base 55 of handle 54. The joystick device 50 may have additional user interface elements thereon, such as push buttons or touch screen elements for selecting a control mode. In the embodiment of FIG. 2, the joystick device 50 has four push buttons, including a Skyhook button 88, a Route button 90, a Heading button 92, and an Adjust button 94. Each button has an activation indicator light associated therewith that indicates whether the associated control mode is activated or not. Specifically, the skyhook button 88 has a Skyhook activation indicator light 89 associated therewith. The Route button 90 has Route activation indicator light 91 associated therewith. The Heading button 92 has Heading activation indicator light 93 associated therewith. The adjust button 94 has two adjust indicator lights 95a and 95b associated therewith. Such indicator lights may be used alone or in conjunction with the adjustable display 69, which in various embodiments may be the upper display 70 or the lower display 80, to indicate the currently-activated control mode for the joystick device 50.

In the embodiment of FIG. 2, the upper display 70 is adjustable to provide mode indicators 71 and control options 72. For example, the upper display 70 may provide a Skyhook mode indicator 71*a* when the joystick device 50 is operating in Skyhook mode, a Heading mode indicator 71*b* when the joystick device is in Heading mode, and a Route mode indicator 71*c* when the joystick device 50 is operating in Route mode. FIG. 4 illustrates an exemplary scenario wherein the joystick 50 of FIG. 2 is in Heading mode. As shown in FIG. 4, an operator 44 may depress the Heading button 92 to activate Heading mode. Upon activation of the Heading mode, the Heading activation indicator light 93 becomes illuminated and the upper display 70 is operated to provide the Heading mode indicator 71*b*. As explained above, the Heading mode indicator 71*b* may be an indicator light that is illuminated on the handle 54 to tell the operator 44 that the joystick device 50 is operating in Heading mode. In other embodiments, the upper display 70 may be an electronic display that adjusts to display the Heading mode indicator 71*b*.

Alternatively or additionally, the adjustable display 69 may include a lower display 80, which may also be used to indicate the control mode, receipt of a control instruction, and/or control options 72. In the embodiment of FIGS. 2-4, the lower display 80 is an illuminable ring 81, which is a circular light display that surrounds the base 55 of the handle 54. The illuminable ring 81 may be illuminated in its entirety, or portions of the illuminable ring 81 may be illuminated. For example, the illuminable ring 81 may blink, provide a trailing light around the circumference in a clockwise or counter-clockwise direction, or may otherwise provide an illumination pattern that indicates a particular mode, receipt of a control command, or to present a control option. Furthermore, the illuminable ring 81 may be illuminated in one or more different colors, which may further be employed to convey information about the control mode, control commands, and/or control options.

In the embodiment shown in FIG. 4, for example, the illuminable ring 81 may be illuminated in a particular color and/or pattern that uniquely indicates that the joystick device 50 is in Heading mode. In one exemplary embodiment, the Heading mode indicator 71*b* displays in orange on the upper display 70, which is on the top portion of the handle 54, and the illuminable ring 81 of the lower display 80 illuminates or flashes around the base 55 of the handle 54 in the same orange color. In such an embodiment, the color orange provides a further indicator that the joystick device 50 is in Heading mode, and such an indicator may be especially beneficial because it is visible from a significant distance.

In the exemplary embodiment of FIG. 4, the upper display 70 presents Heading mode indicator 71*b* as well as Heading control options 72*a* and 72*b*. Likewise, the illumination ring 81 of the lower display 80 may illuminate in a particular color or pattern to indicate Heading mode. In the exemplary embodiment of FIG. 4, the upper display 70 presents Heading control options 72*a* and 72*b* in Heading mode to indicate to the operator 44 options for adjusting the current heading 110 of the marine vessel 10. Heading control options 72*a* indicates to the operator 44 that turning the handle 54 in a clockwise or counter-clockwise direction about axis 57 adjusts the heading by a predefined increment of 10°. Specifically, turning the handle 54 in a clockwise direction adjusts the heading in the starboard direction by 10°, and turning the handle 54 in the counter-clockwise direction about axis 57 adjusts the heading by 10° in the port direction. Likewise, the control options 72 indicate to the operator 44 that tilting, or pushing, the joystick rightward adjusts the heading in the starboard direction by 1°, and pushing the joystick to the left adjusts the heading the port direction by 1°. In other embodiments, the control options 72 may be presented differently, or different control options may be presented to convey to the user what control command will be associated with various movements of the handle 54. In other embodiments, control options 72 may take any form that conveys to the user a control command associated with a particular movement of the handle. For example, in Skyhook mode, the adjustable display 69 may indicate how the handle 54 can be operated to adjust the position of the marine vessel, including the GPS location and/or the heading. As another example, control options 72 could be presented on the adjustable display 69 in Route mode to indicate how the operator 44 can move the handle 54 to adjust the boat propulsion speed, route, and/or current heading, for example.

In reference to FIGS. 2-5, the adjustable display 69 may be a lower display 80 on the housing 52 of the joystick device 50. The lower display 80 may be any type of display that is adjustable to indicate a control mode and/or movement of the handle 54 to provide control commands. In the embodiments of FIGS. 2-4, the lower display 80 is an illuminable ring 81 as is described above. The illuminable ring 81 may be at the base 55 of the handle 54, as shown, or may be a ring around any portion of the housing 52. In still other embodiments, the upper display 70 could be an illuminable ring 81 on a top portion of the handle 54 of the joystick device 50. As described above, the illuminable ring 81 may present various light colors and/or patterns to present information to the operator 44. In one embodiment, the illuminable ring 81 is constructed using light-emitting diodes (LEDs) housed beneath the base 55 of the handle 54 with a light deflecting bezel 83 that reflects and disperses the light from the one or more LEDs to illuminate a portion of the ring or the entire illuminable ring. In other embodiments, the illuminable ring 81 is constructed of an LED ring 84, or a chain of several LEDs around the base 55 of the handle 54 or on another location on the joystick device 50. In such an embodiment, one or more of the LEDs in the LED ring 84 can illuminate in isolation to illuminate a smaller or larger portion of the illuminable ring 81, enabling the creation of animated light patterns which can indicate information to the operator 44. In other embodiments, the illuminable ring 81 may be an electronic display, such as of the types described above, providing a circular illumination pattern. A reflective bezel 83 may also be provided to reflect and disperse the light patterns to make them more visible to an operator looking down on the joystick device 50.

In one embodiment, the illuminable ring 81 may illuminate to indicate receipt of a control command, such as a Heading control command. In such an embodiment, a portion of the illuminable ring 81 may light up in response to an operator 44 moving the handle 54 to provide an instruction to adjust the heading by a predefined increment. For example, if the handle 54 is pushed, or tilted, rightward, providing an instruction to adjust the selected heading 61 by predefined increment α in the starboard direction, a portion of the right side of the illuminable ring 81 may light up. That could be repeated for any directional control command provided by the operator 44. Alternatively or additionally, if the user rotates the handle 54 about its axis 57 to adjust the heading by predefined increment θ, the illuminable ring 81 may provide a trailing light that circles the illuminable ring 81 in the direction that the handle 54 is being rotated. In other embodiments, the illuminable ring 81 may flash, such as to indicate activation of a control mode, receipt of a control command to adjust heading, or an error. In one embodiment, the illuminable ring 81 may flash in a particular color (e.g. orange) to indicate activation of the Heading control mode, and may flash in a different color (e.g. red) to indicate when an error has occurred, such as receipt of an improper control command or an inability to activate a control mode.

Figure 5:
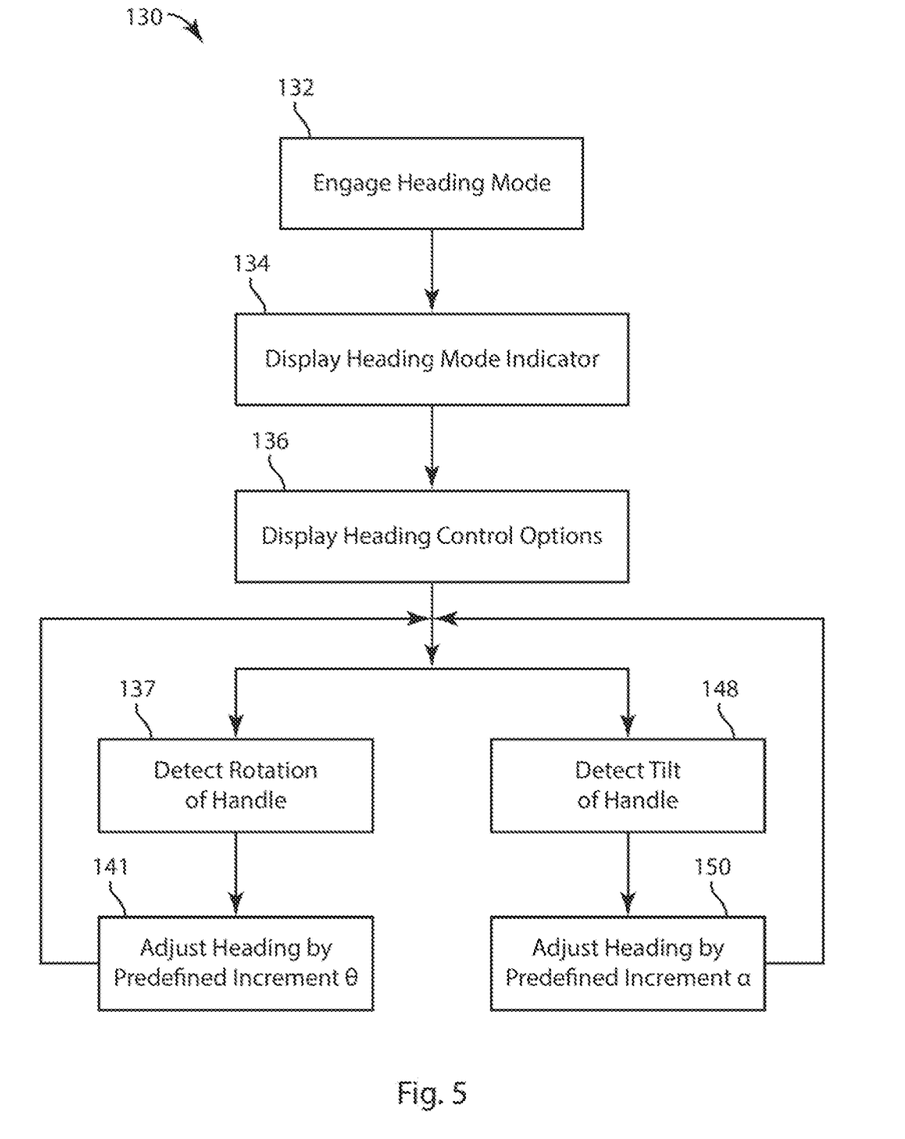
FIG. 5 illustrates one embodiment of a method of controlling a marine vessel.

The lower display 80 may take a form different than the illuminable ring 81. FIG. 5 provides one example of an embodiment of a lower display 80 providing mode indicators 71, including the Skyhook mode indicator 71a, Heading mode indicator 71b, and Route mode indicator 71c, as well as various Heading mode control options 72. In such an embodiment, the lower display 80 may be a set of one or more light indicators, or it may be an adjustable electronic display, such as the embodiments described above with respect to the upper display 70. In an embodiment such as that in FIG. 5, the lower display 80 may be in addition to an upper display 70, or it may be in place of an upper display 70 such that there is no display on the top portion of the handle 54. A lower display 80 such as that shown in FIG. 5, may be provided in addition to or in place of the illuminable ring 81. In an exemplary embodiment where the lower display 80 is an electronic display surrounding the base 55 of the handle 54, the electronic display may be operated to provide the illuminable ring 81 and/or other illumination patterns around the base 55 to indicate an active control mode, receipt of a control command, available control options, and/or indicate an error.

One embodiment of a method 130 of controlling a marine vessel 10 includes engaging a Heading mode at step 132, such as in response to pressing the Heading button 92 as shown and described above. At step 134, a Heading mode indicator 71b is displayed on the adjustable display 69 of the joystick device 50. Control option 72, such as Heading control option 72a and 72b, are also displayed on the adjustable display 69 at step 136. At step 137, rotation of the handle 54 is detected. In response, the selected heading 61 is adjusted by predefined increment θ at step 141. The system then awaits for a potential new instruction from the operator. At step 148, tilt movement of the handle 54 is detected. In response, the selected heading 61 is adjusted by predefined increment α at step 150. The system then awaits a possible new instruction.

Figure 6:
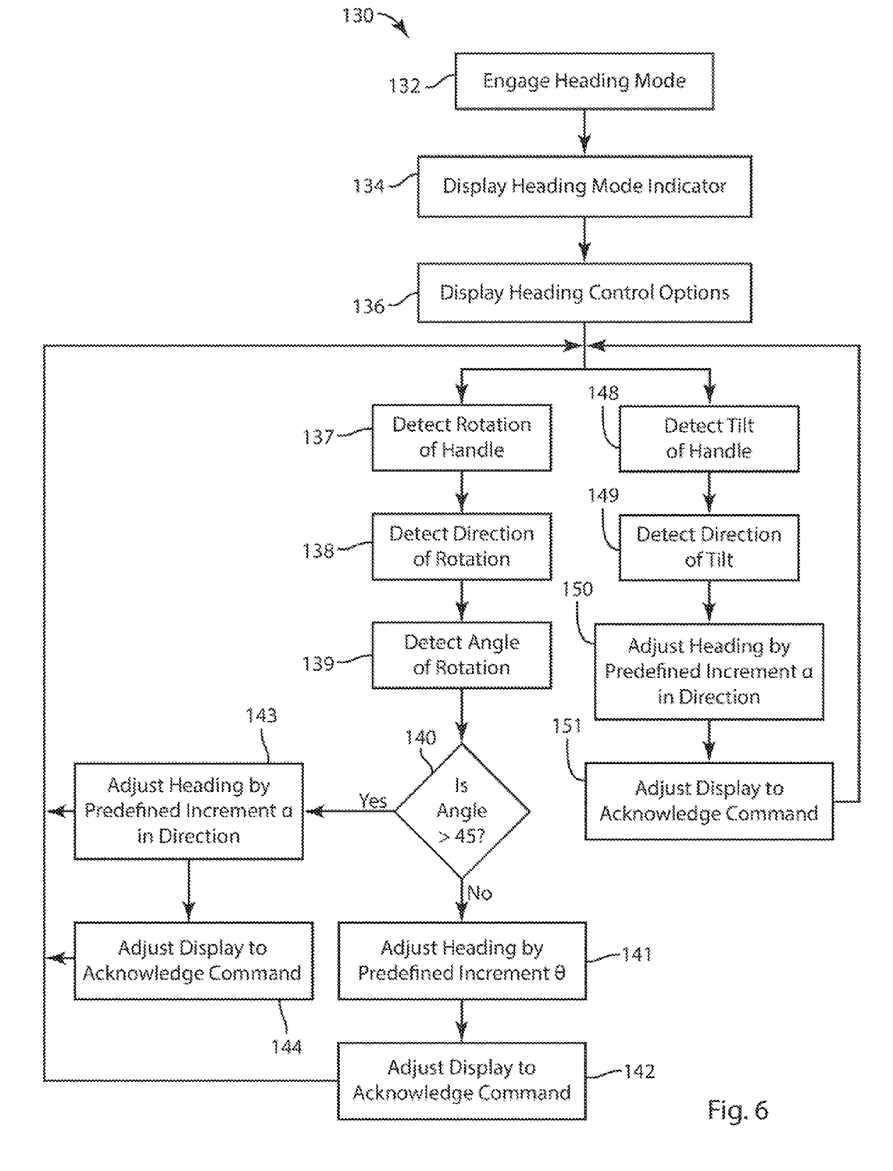
FIG. 6 illustrates another embodiment of a method of controlling a marine vessel.

In another embodiment of a method 130 of controlling a marine vessel 10 includes engaging a Heading mode at step 132, displaying the Heading mode indicator at step 134, and displaying the Heading control options at step 136. At step 137, rotation of the handle 54 is detected. A direction of the rotation is also detected at step 138, and an angle of rotation is detected at step 139. At step 140, the system determines whether the angle of rotation is greater than a first angle, or a first range of angles. For example, if the angle of rotation is greater than 45 degrees, the system proceeds to step 143, where the selected heading 61 is adjusted by predefined increment φ in the direction associated with the direction of rotation of the handle detected at step 138. The adjustable display 69 is then adjusted at step 144 to acknowledge receipt and/or execution of the Heading control command. Returning to step 140, if the angle of rotation is not greater than 45 degrees, and thus is less than or equal to 45 degrees, the system proceeds to step 141 wherein the selected heading 61 is adjusted by predefined increment θ in the direction associated with the direction of rotation detected at step 138. At step 142, the adjustable display 69 is then adjusted to acknowledge receipt and/or execution of the H-leading control command. The system then awaits receipt of a new control command. At step 148, a tilt of the handle 54 is detected. A correction of the tilt is also detected at step 149. At step 150, the Heading is adjusted by predefined increment α in the direction associated with that detected at step 149. At step 151, the adjustable display is adjusted to acknowledge receipt and/or execution of the Heading control command.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

We claim:

1. A propulsion and steering control system for a marine vessel, the system comprising:
   a joystick device operable to provide control commands, the joystick device having a handle extending on an axis; and
   a control unit that receives the control commands from the joystick device and correspondingly controls at least one marine drive;
   wherein the joystick device and the control unit operate in a heading mode such that:
     the control unit controls the marine drive to automatically maintain a selected heading of the marine vessel while the handle is in a neutral position on the axis;
     rotation of the handle about the axis to any angle within an angle range adjusts the selected heading by a first predefined increment, wherein rotation of the handle in a clockwise direction about the axis from the neutral position to any of the angles within the angle range adjusts the selected heading toward starboard by the first predefined increment, and rotation of the handle in a counterclockwise direction about the axis to any of the angles within the angle range adjusts the selected heading toward port by the first predefined increment.

2. The system of claim 1, wherein rotation of the handle about the axis within a first angle range adjusts the selected heading by the first predefined increment, and rotation of the handle about the axis within a second angle range adjusts the selected heading by a second predefined increment, wherein the first predefined increment is different than the second predefined increment.

3. The system of claim 1, wherein tilting the handle away from the axis to any angle within a range of angles adjusts the selected heading by a second predefined increment.

4. The system of claim 3, wherein tilting the handle to any of the angles within the range of angles away from the axis in a first predefined direction adjusts the selected heading toward starboard by the second predefined increment, and tilting the handle to any of the angles within the range of angles away from the axis in a second predefined direction adjusts the selected heading toward port by the second predefined increment.

5. The system of claim 1, further comprising an adjustable display on the joystick device that indicates that the rotation of the handle about the axis adjusts the selected heading by the first predefined increment.

6. The system of claim 5, wherein the adjustable display is on a top portion of the handle.

7. The system of claim 5, wherein the adjustable display displays the first predefined increment and one or more arrows pointing in the clockwise and/or counterclockwise directions.

8. A method of controlling a marine vessel, the method comprising:
providing a joystick device operably connected to a control unit for controlling at least one marine drive, the joystick device having a handle extending on an axis that is rotatable about the axis;
engaging a heading mode at the control unit;
controlling the marine drive with the control unit to automatically maintain a selected heading of the marine vessel while the handle is in a neutral position on the axis;
detecting rotation of the handle in a clockwise direction about the axis from the neutral position to any angle within an angle range;
adjusting the selected heading toward starboard by a first predefined increment in response to the rotation of the handle to any of the angles within the angle range;
detecting rotation of the handle in a counter clockwise direction about the axis from the neutral position to any of the angles within the angle range;
adjusting the selected heading toward port by the first predefined increment in response to the rotation of the handle to any of the angles within the angle range; and
controlling the at least one marine drive with the control unit to propel the marine vessel toward the adjusted selected heading.

9. The method of claim 8, further comprising detecting an angle of rotation of the handle;
determining that the angle is greater than the angle range; and
adjusting the selected heading by a second predefined increment.

10. The method of claim 8, further comprising detecting a tilt of the handle to any angle within a range of angles away from the axis; and
adjusting the selected heading by a second predefined increment in response to the tilt of the handle to any of the angles within the range of angles.

11. The method of claim 8, further comprising providing a heading mode indicator on the joystick device upon engaging the heading mode, wherein providing the heading mode indicator includes operating an adjustable display on the joystick device with the control unit to indicate the heading mode.

12. The method of claim 11, wherein providing the heading mode indicator includes illuminating an indicator light on a top portion of the handle.

13. The method of claim 8, further comprising operating an adjustable display on a top portion of handle to indicate a control option.

14. The method of claim 13, wherein indicating the control option includes displaying on the adjustable display the first predefined increment and one or more arrows pointing in clockwise or counterclockwise directions.

15. The method of claim 8, further comprising operating an adjustable display on a top portion of the handle in response to detection of the rotation of the handle.

16. A propulsion and steering control system for a marine vessel, the system comprising:
a joystick device operable to provide control commands, the joystick device having a handle extending on an axis; and
a control unit that receives the control commands from the joystick device and correspondingly controls at least one marine drive;
wherein the joystick device and the control unit operate in a heading mode such that:
the control unit controls the marine drive to automatically maintain a selected heading of the marine vessel; and
rotation of the handle about the axis adjusts the selected heading by a predefined increment;
wherein rotation of the handle in a clockwise direction about the axis adjusts the selected heading toward starboard by a first predefined increment, and rotation of the handle in a counterclockwise direction about the axis adjusts the selected heading toward port by the first predefined increment;
wherein tilting the handle in a first predefined direction adjusts the selected heading toward starboard by a second predefined increment, and tilting the handle in a second predefined direction adjusts the selected heading toward port by the second predefined increment; and
further comprising an adjustable display on the joystick device that indicates that the rotation of the handle about the axis adjusts the selected heading by the first predefined increment and that tilting the handle in the first predefined direction or the second predefined direction adjusts the selected heading by the second predefined increment.

17. The system of claim 16, wherein the adjustable display is on a top portion of the handle.

18. The system of claim 17, wherein the adjustable display displays the predefined increment and one or more arrows pointing in the clockwise and/or counterclockwise direction.

19. The system of claim 16, wherein the adjustable display displays the predefined increment and one or more arrows pointing in the clockwise and/or counterclockwise direction.

20. The method of claim 9, wherein the angle range is 1 to 45 degrees.

* * * * *